A. GRAH.
CUTLERY.
APPLICATION FILED JUNE 29, 1908.
913,207.
Patented Feb. 23, 1909.
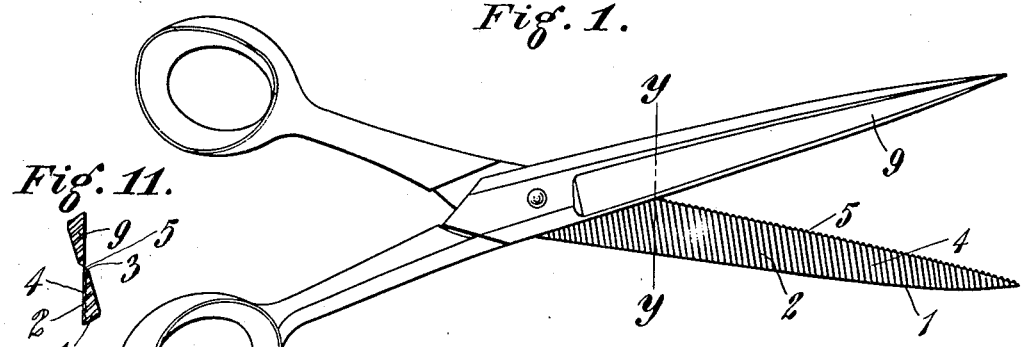
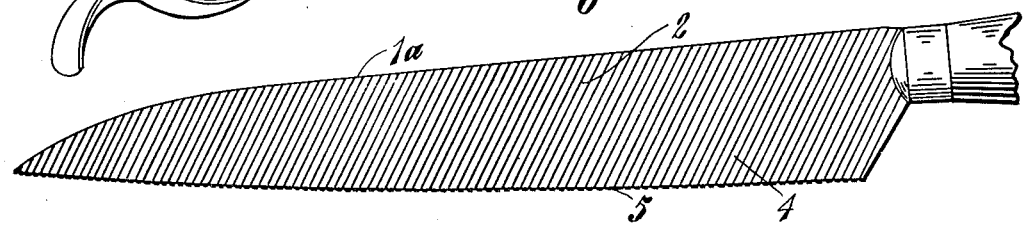
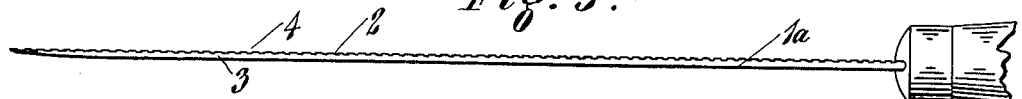
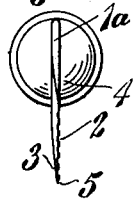
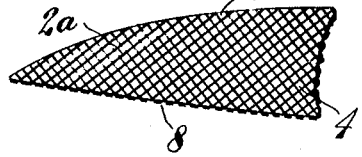
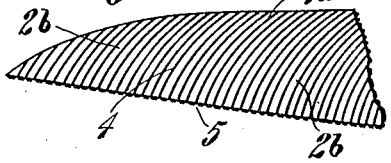
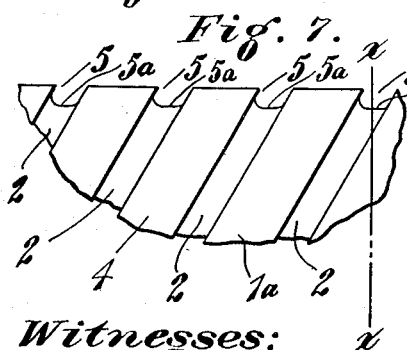
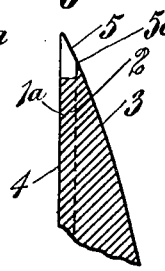
Witnesses:
Clarence Perdue
Florence E. Hammel
Inventor
Albert Grah
By James N. Ramsey
Attorney

UNITED STATES PATENT OFFICE.

ALBERT GRAH, OF CINCINNATI, OHIO.

CUTLERY.

No. 913,207.　　　Specification of Letters Patent.　　　Patented Feb. 23, 1909.

Application filed June 29, 1906. Serial No. 440,885.

*To all whom it may concern:*

Be it known that I, ALBERT GRAH, a citizen of the United States, residing at Cincinnati, in the county of Hamilton and State of Ohio, have invented certain new and useful Improvements in Cutlery, of which the following is a specification.

My invention relates to cutlery, and has for its object the provision of sharp serrations or teeth on the edge of a knife or shear blade that may be maintained thereon when said blade is sharpened repeatedly.

My invention consists in a blade having a sharp edge formed by beveling the blade on one side and having striations on the side opposite to the bevel, said striations extending at an angle to the sharp edge and terminating at the sharp edge, whereby they form in conjunction with the bevel, sharp serrations or teeth on said sharp edge, and whereby, when the sharp edge is renewed, said teeth are maintained.

In the drawing: Figure 1 is a side elevation of a pair of shears embodying my invention. Fig. 2 is a side elevation of a knife blade embodying my invention. Fig. 3 is an elevation of the knife blade illustrated in Fig. 2 looking toward the sharp edge. Fig. 4 is an end elevation of the knife blade illustrated in Figs. 2 and 3. Fig. 5 is a side elevation of part of a blade, illustrating a modification of my invention. Fig. 6 is a view, similar to Fig. 5, illustrating another modification. Fig. 7 is a side elevation of part of a blade, enlarged, illustrating the formation of the teeth by the striations illustrated in Figs. 1 and 2. Fig. 8 is a cross section on a line corresponding to $x$—$x$ of Fig. 7. Fig. 9 is a side elevation of part of a blade, enlarged, illustrating the formation of the teeth by the striations illustrated in Fig. 5 when the striations do not cross each other on the sharp edge. Fig. 10 is a view similar to Fig. 9 illustrating the formation of the teeth by the striations illustrated in Fig. 5 when they cross on the sharp edge. Fig. 11 is a cross section on the line $y$—$y$ of Fig. 1.

Shear blades provided with serrated or toothed edges are advantageous over those having smooth edges for certain purposes, such as hair cutting and for use in cutting coarse or hard materials such as leather, paste-board or paper, in that they enter the material and prevent the slipping of the blades. The advantages of a toothed or serrated edge on knives for certain uses are well known, the teeth in these instances having a cutting function similar to that of the teeth of a saw. Shears have been provided having the edges of one or both blades serrated or toothed; in some such shears, the toothed or serrated edge has a holding function, the teeth being merely formed with sharp points for entering the material but not being provided with sharp edges for cutting it, in which instances, the other blade should be smooth and sharp to perform the cutting.

Other shears have been provided with teeth having sharp cutting edges, as well as sharp points, so that they may hold the material and cut it as well. Where this is the case, both edges of the shears may be provided with teeth. Whether either one or both of the blades is provided with teeth, when the teeth have sharp cutting edges, it may be readily understood that the cutting efficiency of the shears is greatly increased, due to the well known sliding action of the shear blades in conjunction with the sharp edges of the teeth, which may be presented opposite to the direction of said sliding action.

A shear blade having a serrated or toothed edge, whether the teeth have sharp cutting edges or not, is especially advantageous in barbers' shears, since the serrations catch and hold the individual hairs and prevent their slipping along the edge of the blade. For this purpose, it is best that the teeth incline toward the pivotal point of the shears, since they thus allow the uninterrupted insertion of the blades endwise into the mass of hair, and are also best adapted for holding the hairs after the blades have been inserted.

The action of a serrated or toothed edge of a knife, being similar to the action of the toothed edge of a saw, is so well known that no description need here be given. However, the production of serrated or toothed edges on saws, knives or shear blades heretofore has been accomplished by filing the teeth directly on the edge of the blade. The sharpening of a blade provided with teeth in this manner, as is well known in connection with the sharpening of saws, requires the grinding or filing of each individual tooth, involving the greatest of care to maintain the uniformity of the teeth.

It is obvious that, in order to be practical, knife or shear blades should be provided with serrations or teeth in such a manner that the blade may be sharpened without involving any more care or attention than is involved in the sharpening of an ordinary knife or shear blade and at the same time maintain the uniformity of the teeth. I accomplish this result by providing a shear blade 1 with a series of preferably parallel striations 2, extending at an angle to the sharp edge of the blade which is formed by providing the blade with the bevel 3 on one side only. As is usual in the construction of shears, this bevel 3 is provided on the blade 1 on the outside thereof, or on the side opposite to the contacting and coöperating blade 9. The striations 2 are provided on the straight side 4 and terminate on the sharp edge formed by the bevel 3, forming the teeth 5. By providing the striations 2 so that they are inclined, from the back of the shear blade to the sharp edge thereof, toward the pivotal point of the shears, the teeth 5, thus provided, are also inclined toward said pivotal point, with the advantages hereinbefore mentioned.

As illustrated in Fig. 1, the blade 1 only is provided with the striations 2 which form the teeth 5, while the sharp edge of the blade 9 is left smooth. Thus constructed, the teeth 5 are depended upon to hold the material to be cut while the blade 9 performs the cutting, as hereinbefore described.

The knife blade 1ᵃ may be provided with striations 2, and a bevel 3 on one side only, the striations being on the flat side 4 of the blade, opposite the bevel, in which case, teeth 5 will be formed on its sharp edge, similar to the teeth 5 formed on the shear blade 1.
Teeth of modified form may be produced on a blade by providing striations 2ᵃ running in directions at right angles to each other and crossing each other as shown in Fig. 5 of the drawing. These striations may cross each other directly on the cutting edge or may cross each other at a point short thereof, in each case producing teeth of different formation. A blade may be provided with curved striations 2ᵇ, as illustrated in Fig. 6 of the drawing in which case, the teeth formed on the sharp edge will be similar to those formed by the straight striations 2, but will be slightly modified at each repeated sharpening of the blade, due to the constant change of direction of the striations. Such successive modification of the teeth will be found of advantage in certain instances, where it is desired that the form of the teeth shall change to correspond to the change of the form of the blade incident to the sharpening. It is obvious that with the use of such curved striations and with the possibility of inclining them to as great an extent as may be necessary, a great range of adjustment of the form of the teeth is possible.

Adjustment of the form of the teeth on a blade by the use of the striations in conjunction with the beveled edge is due to the fact that the more closely the striations approach a direction parallel to the sharp edge of the blade, the longer, and the more inclined to the line of the cutting edge, will the teeth be. It will also be noted, upon inspection of Figs. 7 and 8 of the drawing, that a sharp edge 5ᵃ is formed between each of the teeth 5, constituting the inner termination of the recess formed between the teeth 5 by the striations 2. A blade thus provided with the striations 2 combines with the teeth 5, and the recesses therebetween, and the cutting edges 5ᵃ in said recesses. Thus, such a blade will have both a holding and a cutting function, making it possible to provide a shear with two such blades as hereinbefore set forth, while, at the same time, the blade may be sharpened by merely abrading its bevel 3 in the well known manner.

A blade combining the holding and cutting functions makes it unnecessary to provide a blade in a shear, for any purpose, with teeth formed on one part of the edge thereof for holding the material, and a continuous cutting edge on another part thereof for operating in conjunction with a continuous edged cutting blade, such as has heretofore been disclosed. This is due to the fact that not only are cutting edges produced in the recesses between the teeth 5, but the teeth 5 have their cutting edges continuous, and due to the inclination of the striations 2 to the sharp edge of the blade, the sides of the teeth 5, in the recesses between them, are also sharpened. Thus, not only is a blade produced combining serrations and a continuous cutting edge, but the effective length of the cutting edge of the blade is increased to a considerable extent over that of a blade having a smooth cutting edge, whether it has such smooth cutting edge in combination with a separate series of teeth for holding the material or whether it is without such teeth.

In the construction of a blade with a smooth cutting edge in combination with a separate series of holding teeth, it is necessary, in order to provide the cutting edge of the well known and desired acute angle used in beveling the blades of shears, that the operating edge of the blade must be of channeled formation with its surface sloping away from the smooth cutting edge at one side, and away from the teeth at the other side, toward the middle, the smooth cutting edge being on the inside, adapted to come adjacent to the edge of the coöperating cutting blade. If such channeled formation is not present, the holding blade must necessarily present toward its coöperating cutting blade an obtuse angle, the cutting efficiency of which is far inferior to that of the acute angle generally employed. By providing a shear blade 1 having the bevel 3 on the side opposite to the coöperating blade 9, as is usual in the construction of shears, and by providing the striations 2 on the flat side 4 of the blade, adjacent to the coöperating blade 9, the acute angle of the operating edge, with all its advantages, is produced, while the serrations or teeth 5 are also produced, having the holding and cutting functions combined. Variations of the teeth may be attained by employing striations that cross each other, as illustrated in Figs. 5, 9 and 10 of the drawing. Thus, it will be noted that in Fig. 9, where the striations cross each other at points short of the sharp edge of the blade, the teeth 6 are relatively small and each has a relatively large proportion of cutting edge, while the teeth alternating therewith are of a different character with a smaller relative proportion of cutting edge, but adapted to coöperate with the teeth 6 in bringing the particles of the material to be cut against the edges of the teeth 6. Such a formation of teeth is especially desirable in a knife blade, since the cutting is thus performed upon the movement of the blade in both directions. This is also true of the teeth provided in the modification illustrated in Fig. 10 of the drawing, where the striations 2ª cross at points along the sharp edge of the blade, and where a single series of teeth 8 similar to each other are provided somewhat resembling the teeth 6, provided in the modification illustrated in Fig. 9, but being coarser and having a smaller proportion of cutting edge.

My invention is especially adapted for producing an efficient knife for cutting bread, as illustrated in Fig. 2 of the drawing, the serrated or roughened edge being adapted to more readily engage and cut through the bread without packing or pressing the particles of bread together, as frequently occurs with the straight edged bread knife.

Having fully described my invention, what I claim as new and desire to secure by Letters Patent is:

1. In hand cutlery, a blade having a sharp continuous serrated cutting edge formed by providing the blade with a bevel on one side and with a series of striations on the side opposite to the bevel, said striations extending obliquely to and forming part of said continuous cutting edge and being inclined along the cutting edge toward the handle, in combination with a coöperating blade engaging therewith along the sharp continuous cutting edge on the side opposite to the bevel and adjacent to the side on which the blade has the striations, whereby the striations in conjunction with the bevel form a combined holding and cutting means, and whereby when the sharp edge is renewed said serrations are maintained as part of said continuous cutting edge, substantially as set forth and for the purposes specified.

2. In cutlery, a blade having a sharp edge formed by providing the blade with a bevel on one side, and having striations on the side opposite to the bevel, said striations extending at an angle to the sharp edge, part of the striations crossing the other striations and terminating at the sharp edge, whereby they form in conjunction with the bevel, serrations or teeth on said sharp edge having acute cutting edges presented in both directions and adapted to be maintained acute by the uniform abrasion of the bevel of the blade.

ALBERT GRAH.

Witnesses:
JAMES N. RAMSEY,
CLARENCE PERDEW.